Patented Feb. 13, 1951

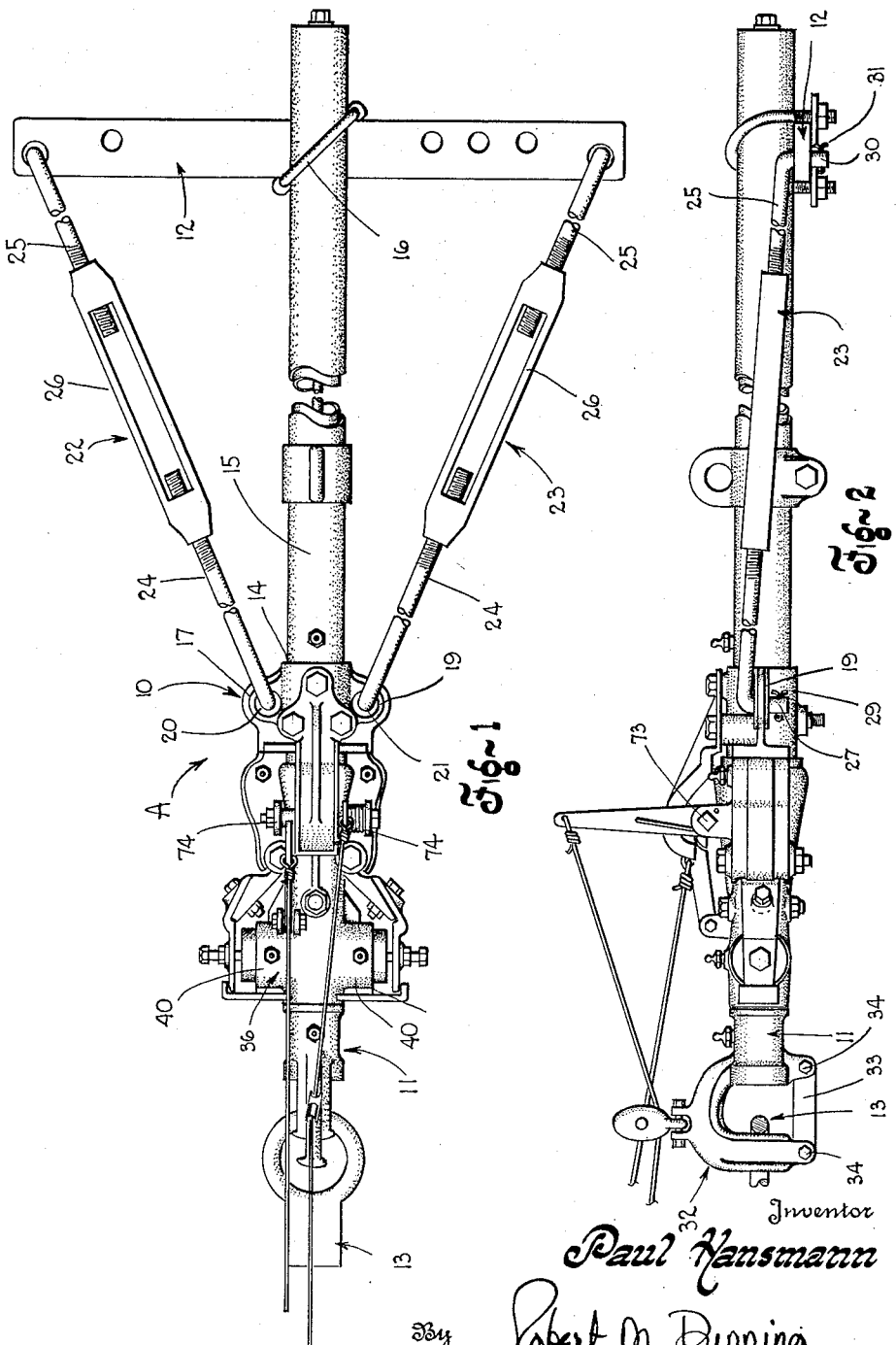

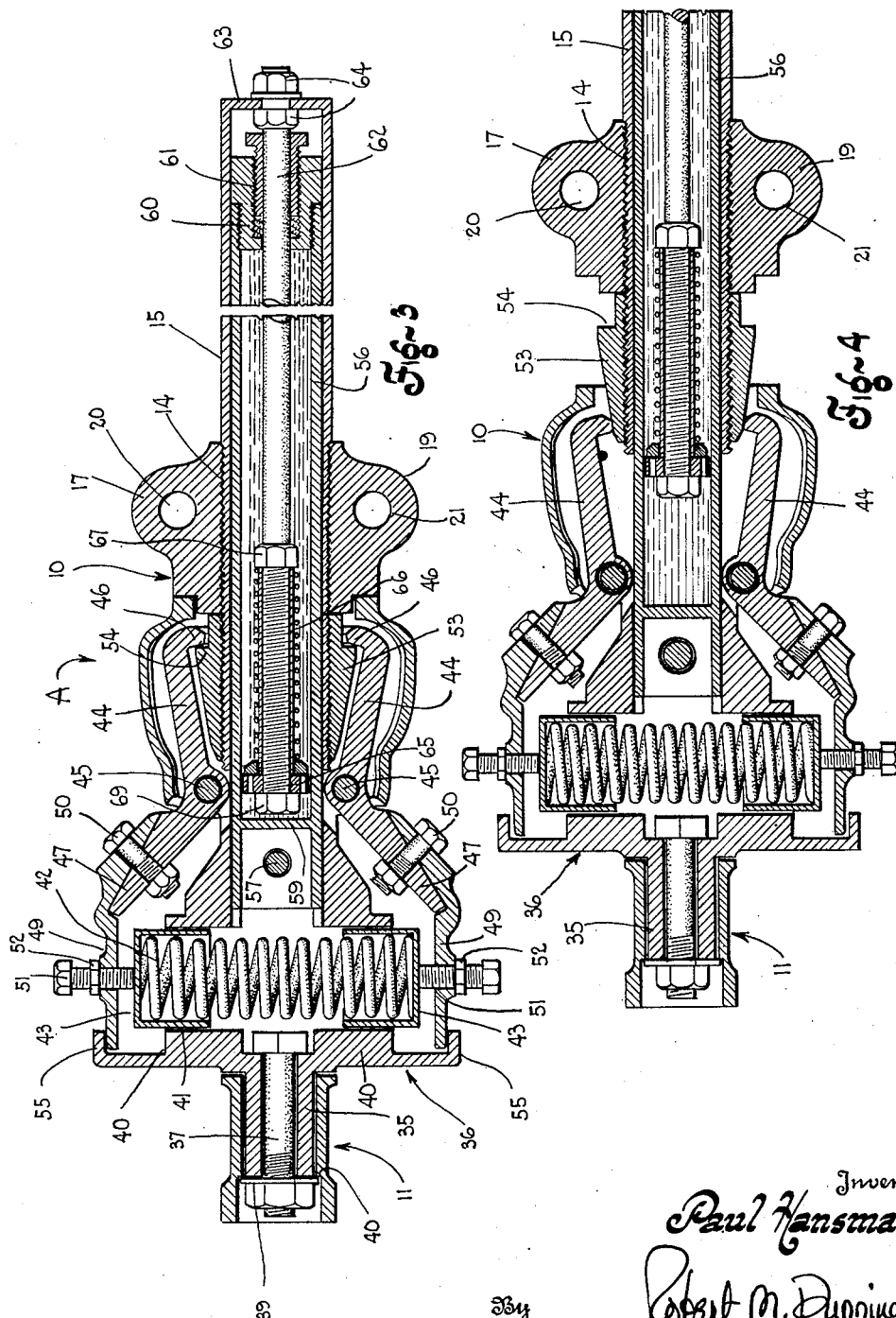

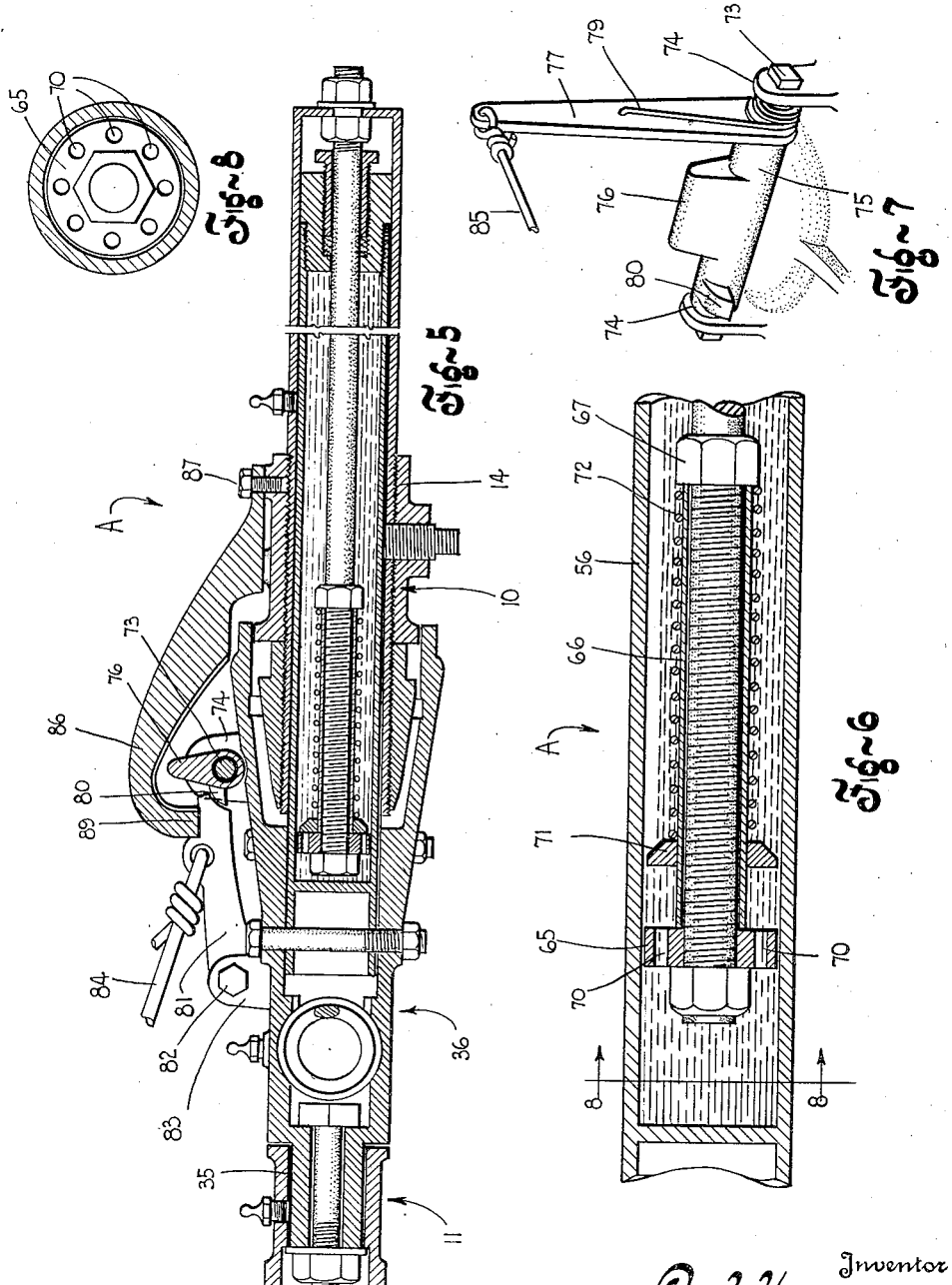

2,541,356

UNITED STATES PATENT OFFICE 2,541,356

TRACTOR HITCH

Paul Hansmann, Long Prairie, Minn.

Application April 3, 1947, Serial No. 739,169

10 Claims. (Cl. 280—33.9)

My invention relates to an improvement in tractor hitch and deals more particularly with a type of hitch used for connecting a tractor to a plow or other implement.

When a tractor is pulling a plow or other implement, care must be taken to prevent injury to the driver and other equipment in the event the plow strikes a rock, stump, or other obstruction. If a rigid hitch is employed the tractor must travel at an extremely low speed in the interests of safety. Even in such an event, there is a considerable likelihood that the equipment will be seriously damaged by the engagement of the plow with an immovable object. During the past year many persons have been killed or seriously injured when a tractor pulls a plow into such an obstruction.

It is the object of the present invention to provide a tractor hitch which will elongate when subjected to an unusual pulling strain, thereby allowing the tractor to travel a short distance after the plow stops movement. Means are also provided to connect the tractor hitch with the clutch of the tractor so that the pulling force of the tractor is stopped as soon as the plow strikes the obstruction.

A feature of the present invention resides in the provision of a hydraulic cylinder and a piston movable in the cylinder. The cylinder is movably mounted relative to the piston, one of these elements being secured to the tractor and the other of the elements being secured to the implement being drawn. The piston is so proportioned relative to the cylinder that hydraulic fluid may pass the cylinder when sufficient pull is exerted between the relatively movable parts. As a result the tractor is gradually stopped from movement after the plow or other implement strikes an immovable object. The speed at which the tractor is brought to a halt depends upon the relative proportions of the piston and cylinder.

A feature of the present invention resides in the provision of a means whereby the hydraulic fluid may quickly pass the piston in one direction, but must pass the piston in the opposite direction at a much slower rate. As a result once the hitch has been elongated by the second stopping of the plow the hitch may be again telescoped into normal position by a reverse movement of the tractor. This reverse movement of the tractor is not greatly impeded by the fluid within the hydraulic cylinder.

A feature of the present invention resides in the provision of a pair of opposed dogs which engage a shoulder on the member which is movable relative to the dogs. These dogs are held in engagement with the shoulder by variable spring pressure. If sufficient pulling force is exerted against the relatively movable members, the shoulder will act to spread the dogs apart and to allow the elongation of the hitch.

A feature of the present invention resides in the manner in which the clutch of the tractor is disengaged. The hitch is provided with a lever arm connected to the clutch of the tractor by a cable or other suitable connecting means. This lever is mounted for rotation with a cam. Relative longitudinal movement between the piston and cylinder acts to pivot the cam and to exert a pulling force upon the cable connecting the lever with the tractor clutch. Thus the clutch is automatically actuated when the two parts of the hitch move relative to one another.

A further feature of the present invention lies in the provision of a pawl or dog which holds the clutch out of engagement when once disengaged. My tractor clutches are provided with spring means which normally tend to hold the clutch engaged. The dog or pawl on my hitch holds the operating lever in position to maintain the clutch disengaged.

These and other objects and novel features of my invention will be more clearly and fully set forth in the following specification and claims.

In the drawings forming a part of my specification:

Figure 1 is a top plan view of my tractor hitch showing the construction thereof.

Figure 2 is a side elevational view of the same.

Figure 3 is a sectional view through the hitch showing the dogs holding the relatively movable parts of the hitch from relative movement.

Figure 4 is a sectional view similar to Figure 3 showing the dogs after they have been disengaged and at the beginning of relative slidable movement between the relatively slidable portions of the hitch.

Figure 5 is a sectional view on a vertical plane through the same.

Figure 6 is a sectional view through the cylinder during the return stroke of the piston toward engaged position.

Figure 7 is a perspective view of the clutch actuating lever and cam showing the construction thereof.

Figure 8 is a sectional view through the hydraulic cylinder forming a part of the hitch, the position of the section being indicated by the line 8—8 of Figure 6.

The tractor hitch A illustrated in the drawings includes a body portion 10 which is normally secured in fixed relation to a plow or other implement and a relatively stationary end 11 which is designed for connection with a tractor. The numeral 12 designates a cross member on the front of a plow to which the hitch is secured. The ring 13 normally forms a part of the rear end of a tractor and is fixedly secured thereto.

The body 10 is provided with a threaded aperture 14 in which is threadably secured a tubular cylinder 15. The cylinder 15 extends rearwardly to a point adjacent the plow cross member 12 to which it may be secured by means of a U bolt 16. The body 10 adjacent the aperture 14 and on diametrically opposite sides thereof is provided with laterally projecting ears 17 and 19. These ears are provided with apertures 20 and 21 respectively. Connecting links indicated in general by the numerals 22 and 23 connect the ears 17 and 19 respectively to the cross member 12. Each link 22 and 23 includes a pair of threaded rods 24 and 25 which are connected by a turn buckle 26. The rods 24 and 25 are oppositely threaded so that rotation of the turn buckle 26 in one rotative direction will tend to contract the link, while rotation thereof in the opposite direction will tend to elongate the link. Each of the link members 24 is provided with a downturned end 27 designed to extend through an ear such as 17 or 19, being held in place by any suitable means such as a cotter key 29. Each of the link members 25 is provided with a downturned end 30 designed to extend through the cross member 12. The end 30 is held in place by means of a cotter key 31 or other suitable means. The links 22 and 23 thus support the body 10 properly aligned with the plow and withstand the pulling strain of the hitch.

The body member 11 forms a part of a detachable connection 32 by means of which the hitch may be secured to the tractor draw bar 13. The detachable connection 32 includes an arch shaped element having a pivotally supported link 33 closing the open lower end thereof. Bolts such as 34 normally hold the link 33 in place. By removing either of the bolts 34 the link 33 may be pivoted out of arch closing position so that the link 13 may be inserted into the connecting member or removed therefrom.

The body member 11 comprises a sleeve which encircles the hollow shank 35 of the housing 36. The housing 36 is designed to enclose the working mechanism which holds the two parts of the hitch connected together. A bolt 37 extends through the hollow shank 35 and is provided with a washer 39 near its outer end which engages against a shoulder 40 on the sleeve like body member 11. Thus a pull upon the body member 11 is transmitted through the bolt 37 to the housing 36.

As best illustrated in Figure 1 of the drawings the housing 36 is provided with a pair of opposed sleeves 40 projecting therefrom. As shown in Figures 3 and 4 of the drawings a continuous passage 41 is formed through these opposed sleeves 40. The spring 42 extends through the passage 41 and the ends of the spring 42 are enclosed by cup shaped pistons 43. These pistons 43 are urged apart by the spring 42.

A pair of dogs 44 in the form of bell crank levers are pivoted by means of spaced parallel pivots 45 to the housing 36. These dogs 44 are provided with hook shaped extremities 46 for a purpose which will be later described in detail. The opposite ends 47 of the dogs 44 are attached to extensions 49 by means of bolts 50 or other suitable means. The extensions 49 could be an integral part of the dogs or bell crank levers 44, but are made separate in order that access may be gained to the spring 42 without entirely disassembling the structure.

Set screws 51 extend through the extensions 49 and are held in adjusted position by lock nuts 52. The set screws 51 engage against the ends of the cup shaped spring end enclosures 43. Thus the initial tension of the spring 42 may be adjusted by moving the set screws 51. The spring 42 acts through these set screws to urge the dog extensions 49 apart and to pivot the hook shaped ends 46 of the dogs 44 together.

A collar or sleeve 53 having a generally frustoconical outer surface is internally threaded for engagement with the threaded end of the cylinder 15. This collar or sleeve 53 is provided with a shoulder 54 over which the hook shaped ends 46 of the bell crank levers 44 engage. The spring 42 normally holds these ends 46 engaged with the shoulder 54. However, if sufficient pull is exerted upon the cylinder 15 and collar 53, the hook ends of the dogs 44 will be urged apart compressing the spring 42 and allowing relative separation of the relatively movable parts of the hitch and allowing elongation of the hitch.

As best noted in Figures 3 and 4 of the drawings the housing 36 extends over the hook shaped ends of the bell crank levers 44 to enclose these working parts. Hook-like extensions 55 are provided on the casing 36 which are engageable with the dog extensions 49 in normal position thereof to limit the pivotal movement of these dogs in one direction.

The outer cylinder 15 encloses a relatively slidable inner cylinder 56. This inner cylinder 56 is bolted or pinned at 57 to the housing 36, so as to be stationary relative thereto. A partition wall 59 is provided in the cylinder 56 spaced from the forward end thereof so as to form a closed cylindrical end. A plug 60 is threaded into the other end of the cylinder 56 to close this other end. A packing joint 61 is provided within the plug 60 and seals the plug 60 relative to a piston rod 62 extending through the plug 60. The piston rod 62 extends through the closed rear end 63 of the cylinder 15 and is secured thereto by means of lock nuts 64. The piston rod 62 supports a piston 65 within the cylinder 56. The piston 65 is held from movement in one direction by a spacing sleeve 66 which abuts on one end against the piston 65 and abuts at its other end against a nut 67 threaded on the rod 62. A nut 69 engages against the opposite side of the piston 65 to lock the piston in place.

As best illustrated in Figure 8 of the drawings a series of angularly spaced apertures 70 extend through the piston 65. The outer diameter of the piston 65 is sufficiently smaller than the inner diameter of the cylinder 56 to allow liquid to flow past the piston at a predetermined rate. A valve ring 71 encircles the tubular spacer 66 and is longitudinally slidable thereover. A spring 72 is interposed between the nut 67 and the valve ring 71 to urge this valve ring against the piston 65. The valve ring 71 is somewhat smaller in outer diameter than the piston 65 and when in position against the piston 65 closes one end of the apertures 70.

The operation of this portion of my hitch is believed obvious from the foregoing description. The spring 42 is adjusted in tension so that the dogs 44 are urged against the shoulder 54 with a predetermined force. When the longitudinal pull upon the cylinder 15 and the links 22 and 23 exceeds a predetermined maximum the dogs 44 are urged outwardly, compressing the spring 42. As soon as the dogs 44 are free of the shoulder 54, the cylinder 15 and body member 10 secured thereto may move relative to the housing 36 and its connecting member 11 by means of which the housing is connected to the tractor. As a result if a plow or other implement strikes an immovable object, the dogs 44 are urged apart and the cylinder 15 and body member 10 connected thereto remain stationary while the forward portion of the hitch 11 which is connected to the tractor may continue to move forwardly.

Forward movement of the tractor is resisted by the piston 65 within the cylinder 56. Forward movement of the body member 11 and housing 36 connected thereto moves the cylinder 56 forwardly while the piston 65 remains stationary. The cylinder 56 is partially filled with liquid. As the end 60 of the cylinder 56 moves toward the piston 65, the liquid in the portion of the cylinder to the right of the piston, as viewed in the drawings, must flow past the piston. As the space between the piston and the wall of the cylinder is relatively small, the relative separation of the body members 10 and 11 is resisted, tending to bring the tractor to a stop. We have found that my hitch is capable of bringing a tractor to a complete stop from a speed of 6 to 8 miles an hour in two or three feet or less, without injury to the operator of the tractor. Thus while the deceleration is rapid, the tractor may be stopped without dislodging the operator or injuring him.

As previously stated the cylinder 56 is not entirely filled with liquid. As the piston rod 62 displaces a susbtantial amount of liquid, the cylinder may be substantially full when the hitch is in its contracted form as illustrated in Figure 3. Any oil which leaks from the cylinder through the packing 61 may be replaced, although the quantity of oil contained in the cylinder is not usually critical, unless a substantial amount of the fluid escapes.

After the hitch has been elongated as just stated, the movement of the tractor may be reversed to dislodge the plow or other implement from its obstruction. As the tractor moves rearwardly toward the plow the end member 11 of the hitch is moved toward the body member 10 thereof until the hook shaped ends 46 of the dogs 44 engage the cone shaped collar 53. The dogs are spread apart by movement over this collar until the hook ends thereof engage over the shoulder 54, whereupon the spring 52 elongates and again holds the dogs against the shoulder 54. During this reverse movement of the piston 65 within the cylinder 56, the oil or other fluid travels not only around the circumference of the piston 65, but also passes through the apertures 70, forcing the valve collar 71 away from the piston and compressing the spring 62. As a result the fluid may flow past the piston in one direction much more easily than in the other direction so that a minimum of force is required to urge the hitch into compressed position.

As best illustrated in Figures 1, 2, 5 and 7 of the drawings a shaft 73 is supported to extend between upwardly projecting ears 74 on the housing 36. A sleeve 75 is mounted upon the shaft 73 to rotate thereupon. A cam arm 76 is provided on the sleeve 75 to rotate therewith. A lever arm 77 is likewise secured to the sleeve 75 to rotate therewith and a spring 79 urges this lever arm 77 toward one extreme position. A latch 80 is likewise provided on the sleeve 75. A dog or ratchet 81 is provided on the housing 36, and which is pivotally supported on a pivot bolt 82 extending between two spaced upwardly projecting ears 83. A cord or cable 84 is secured to the dog 81 to provide a means of manually pivoting this dog from the position of the tractor operator. A cable 85 extends from the extremity of the lever arm 77 to the clutch of the tractor so as to throw the clutch out of operation when the lever arm 77 is pivoted rearwardly. The dog 81 is engageable with the latch 80 in one position of this latch so as to hold the lever arm 77 in clutch disengaging position.

A cam arm 86 is secured by bolts 87 or other suitable means to the casing 10 and this cam arm is engageable with the cam 76 upon relative longitudinal movement between the housing 36 and the body member 10. In other words, as the housing 36 moves forwardly relative to the body member 10, the cam 76 strikes against the downwardly projecting end 89 of the cam arm 86, pivoting the cam 76 in a clockwise direction when viewed as in Figure 5 of the drawings. This action swings the latch 80 upwardly until it passes the end of the dog or pawl 81. The dog 81 then engages against the latch to prevent the return of the lever arm 77 to vertical position until the dog is released by a pull upon the cord or cable 84.

The clutch mechanism of the tractor is not disclosed in the drawings as previous patents illustrate cable connections between a hitch and the tractor clutch.

In accordance with the patent statutes, I have described the principles of construction and operation of my tractor hitch, and while I have endeavored to set forth the best embodiment thereof, I desire to have it understood that obvious changes may be made within the scope of the following claims without departing from the spirit of my invention.

I claim:

1. A tractor hitch including a member designed for attachment to a tractor, a second member designed for attachment to an implement, a cylinder secured to one of said members, a piston rod secured to the other of said members, a piston secured to said piston rod and supported within said cylinder, cam shaped means including a shoulder supported on opposite sides of one of said members, a pair of opposed dogs pivotally secured intermediate their ends to the other of said members and each having one end engageable against said shoulder to hold said members from relative movement, and a single double acting spring interposed between the other ends of said dogs to urge the same into engagement with said shoulder.

2. A tractor hitch including an elongated sleeve having a closed end, a cylinder longitudinally slidable in said sleeve, a piston rod secured to the closed end of said sleeve, and extending into said cylinder, a piston on said piston rod within said cylinder, said piston being designed to permit a restricted fluid flow in one direction only a member designed for attachment to a tractor, a second member designed for attachment to an implement, one of said members being secured to said sleeve, and the other of said members being secured to said cylinder.

3. A tractor hitch including an elongated sleeve, a closed end thereupon, a cylinder longitudinally slidable within said sleeve toward and away from said closed end, a piston rod secured to said closed end and extending into said cylinder, a piston on said piston rod within said cylinder, a cam means on said sleeve including a shoulder, a dog pivotally secured to said cylinder and normally engaged with said shoulder to hold said sleeve and cylinder from relative slidable movement, said dog being retractable by said cam means when an abnormal pull is exerted on the hitch.

4. A tractor hitch including an elongated sleeve, a closed end thereupon, a cylinder longitudinally slidable within said sleeve toward and away from said closed end, a piston rod secured to said closed end and extending into said cylinder, a piston on said piston rod within said cylinder, a cam means on said sleeve including a shoulder, a dog pivotally secured to said cylinder and normally engaged with said shoulder, and means resiliently urging said dog into engagement with said shoulder said dog being pivoted by said cam means out of engagement with said shoulder upon an abnormal pull upon the hitch.

5. A tractor hitch including an elongated sleeve, a cylinder secured for longitudinal slidable movement within said sleeve, a piston rod secured to said sleeve and extending into said cylinder, a piston on said piston rod within said cylinder, said piston being designed to allow a restricted passage of fluid thereby when said piston is travelling in one direction, apertures through said piston, a valve plate slidable on said rod and normally closing said apertures, and holding said apertures closed while said piston travels in one direction, and means resiliently urging said plate against said piston to allow said apertures to open upon movement of said piston in the opposite direction.

6. A tractor hitch including an elongated sleeve, a cylinder longitudinally slidable within said sleeve, a piston rod secured to said sleeve and extending into said cylinder, a piston on said piston rod within said cylinder, a cam means on said sleeve including a shoulder, a pair of opposed hook shaped elements pivotally secured to said cylinder for movement therewith, resilient means normally urging said hook shaped members into engagement with said shoulder said hook shaped elements being pivoted by said cam means out of engagement with said shoulder upon an abnormal pull upon the hitch.

7. A tractor hitch including a pair of telescoping members, means connecting one of said members to a tractor, means for connecting the other of said members to an implement, one of said telescoping members having a tapered cam thereupon having a shoulder at one end of the cam, the other of said members having a pair of opposed levers thereon pivoted thereto intermediate the ends of the levers, said levers having hook shaped ends thereupon designed to engage said shoulder, and the other of said ends extending in substantially parallel relationship and a transverse spring interposed between said parallel ends for urging said hook shaped ends against said shoulder.

8. The structure defined in claim 7 in which one of said members includes a cylinder movable therewith and the other of said members includes a piston movable therewith.

9. The structure defined in claim 7 and including a cup shaped receptacle enclosing each end of the spring.

10. The structure described in claim 7 and including a cup shaped enclosure for each end of the spring and a threaded element through the parallel ends of said levers adjustably engaging said cup shaped elements.

PAUL HANSMANN.

REFERENCES CITED

The following references are of record in the file of this patent:

UNITED STATES PATENTS

| Number | Name | Date |
| --- | --- | --- |
| 1,933,387 | Patterson | Oct. 31, 1933 |
| 2,102,722 | Kortering | Dec. 21, 1937 |